United States Patent
Van der Linde

(10) Patent No.: US 6,478,652 B1
(45) Date of Patent: Nov. 12, 2002

(54) TWO-LEGGED BODY

(75) Inventor: Richard Quint Van der Linde, Vlaardingen (NL)

(73) Assignee: Technische Universiteit Delft, Vlaardingen (NL)

( * ) Notice: Subject to any disclaimer, the term of this patent is extended or adjusted under 35 U.S.C. 154(b) by 0 days.

(21) Appl. No.: 09/700,503

(22) PCT Filed: Nov. 18, 1999

(86) PCT No.: PCT/NL99/00238
§ 371 (c)(1),
(2), (4) Date: Feb. 12, 2001

(87) PCT Pub. No.: WO99/58215
PCT Pub. Date: Nov. 18, 1999

(30) Foreign Application Priority Data

May 13, 1998 (NL) .............................................. 1009144

(51) Int. Cl.[7] .................................................. A63H 7/00
(52) U.S. Cl. ........................... 446/355; 446/330; 623/26
(58) Field of Search ................................. 446/354, 355, 446/352, 330, 364, 361; 40/418, 420; 623/26, 35, 14.13

(56) References Cited

U.S. PATENT DOCUMENTS 1,599,290 A * 9/1926 Sato
4,349,987 A * 9/1982 Bart
4,944,708 A * 7/1990 Kawabe ...................... 446/175
5,087,219 A * 2/1992 Price .......................... 446/336
6,223,648 B1 * 5/2001 Erickson ....................... 92/92

FOREIGN PATENT DOCUMENTS

DE    88 14 976 U    1/1989
EP    0 531 731 A    3/1993

OTHER PUBLICATIONS www.google.com, (key words "McKibben Muscles") see attached.*
article, "Bipedal Walking with Active Springs" (Appendix 2A, pp. 203–204) by Richard Quint Van der Linde.*

* cited by examiner

Primary Examiner—Derris H. Banks
Assistant Examiner—Jamila Williams
(74) Attorney, Agent, or Firm—Kinney & Lange, P.A.

(57) ABSTRACT

A two-legged body includes at least two legs, and oscillation element and connecting element for the mutual coupling of the legs and the oscillation element, wherein the legs are pivotable in relation to the connecting element and during operation undergo a reciprocating angular displacement in relation to the connecting element, depending on the oscillation element. The oscillation element includes at least two springs for the generation of antagonistic forces, which springs each are coupled at one side with a leg, and together with the mass present in the body they are able to form a vibrating mass-spring system. The spring stiffness of at least one spring is adjustable.

5 Claims, 1 Drawing Sheet

TWO-LEGGED BODY

The present invention relates to a two-legged body comprising two legs, an oscillation element and a connecting element for the mutual coupling of the legs and the oscillation element, wherein the legs are pivotable in relation to the-connecting element and during operation undergo a reciprocating angular displacement in relation to the connecting element, depending on the oscillation element.

U.S. Pat. No. 1,599,290 discloses a body with four legs that are pivotably attached to a frame, and wherein oscillation elements in the form of springs are connected to the legs to cause the body to perform a walking motion.

A two-legged body according to the preamble of the main claim is known from the European patent application EP-A-0 531 731. The known device comprises two legs which are pivotably fastened at their top end to a horizontally oriented axis and in which each leg at its other end is provided with a foot having an arched surface. The known body is further provided with a pendulum also fastened to the axis, which can be made to oscillate and which in association with a traction force exerted on the known body, is able to provide the body with a movement by reciprocally moving its legs in counter phase, so that the two-legged body makes a walking movement.

A first disadvantage of the known two-legged body is that for the locomotion it is necessary to provide a separate traction force, as the oscillatory motion only suffices to cause the reciprocal movement of the two lets of the body. If such a force is not supplied separately, it can be provided by placing the known body on a sloping surface, so that the known body is provided with a force component in the horizontal plane, thereby allowing the body to move. A second disadvantage of the known two-legged body is that the walking movement is decided once the geometry of the body has been chosen.

The object of the invention is to provide a two-legged body that is able to carry out a walking movement without requiring the provision of a traction force other than the oscillatory motion, in such a manner, that the energy for locomotion is derived from the autonomous oscillation energy.

To this end the two-legged body according to the invention is characterized in that the oscillation element comprises at least two springs for the generation of antagonistic forces, that the springs are coupled at one side with a leg, and that together with the mass present in the body they are able to form a vibrating mass-spring system, and that the spring stiffness of at least one spring is adjustable. By this measure a two-legged body is provided with legs whose reciprocal movement from which the walking movement is derived, is to a large extent adjustable. The adjustment or alteration of the spring stiffness directly influences the frequency at which the mass-spring system preferentially vibrates. In addition, the alteration of the spring stiffness gives impetus to the mass-spring system, so that such an alteration produces energy from which the locomotive energy of the body can be derived. The amplitude of the vibration of the mass-spring system is also determined by the measure in which the spring stiffness is altered during operation. A large number of aspects of the two-legged body according to the invention can be controlled in this way without the need to provide motors and servo systems which are known as such, for the realization of the desired contollability. Due to the fact that such provisions may be absent, the known two-legged body can be embodied such as to be relatively light, thereby limiting the energy requirements and making the two-legged body very suitable for robotic and rehabilitation purposes. It should be noted that the body according to the invention can also be constructed with only one spring, in such a manner that to provide the antagonistic force for the spring, use is made of the gravitational force. However, compared with the embodiment with two springs, such a construction appears to be less flexible.

A workable embodiment producing a locomotive rhythm that for two-legged bodies appears very natural is characterized in that at the side facing away from the coupling with the leg, each of the springs is coupled with the connecting element, and that the springs are arranged at both sides of the leg.

This may be realized particularly simply if the connecting element is embodied with a cylindrical rotating spool, via which rotating spool a connecting cable or strip is led which is connected at both its ends with the two springs.

The locomotion of the two-legged body according to the invention may be suitably advanced by an embodiment in which each of the legs is mounted on an individual auxiliary frame, auxiliary frame is rotatably mounted on the connecting element, and each leg is adjustable in the longitudinal direction of its auxiliary frame. This provides the two-legged body, again in a natural manner, with a propelling force the moment the reciprocal movement of the respective leg is virtually completed but is still just in contact with the supporting surface from which the leg can push off.

Figures 1, 2:
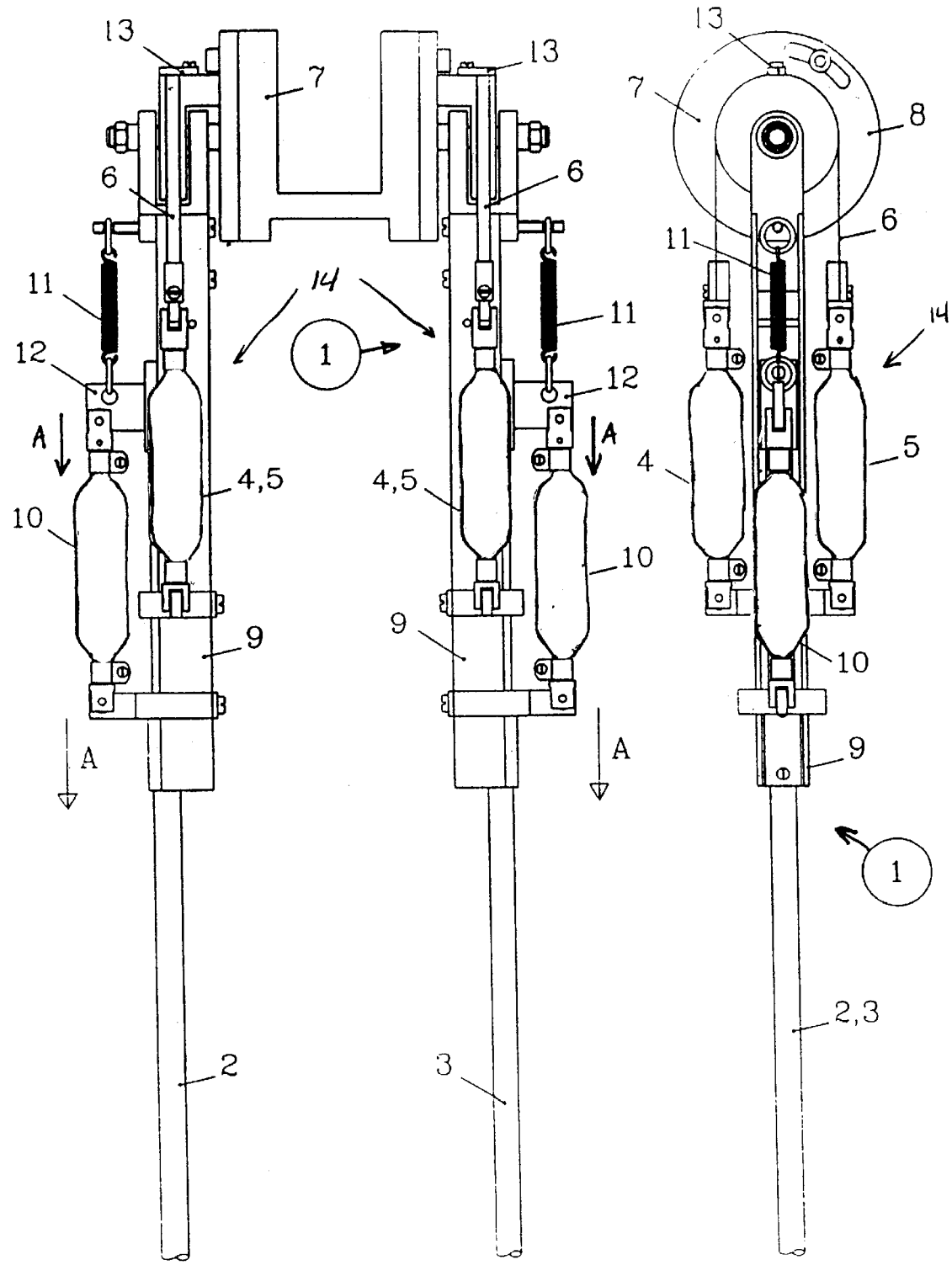
FIG. 1 is a front view of a two-legged body constructed in accordance with a preferred embodiment of the invention.
FIG. 2 is a side view of a two-legged body constructed in accordance with a preferred embodiment of the invention.

The invention will now be explained in more detail with reference to the drawing which in FIGS. 1 and 2 shows a non-limiting exemplary embodiment in front and side view of the two-legged body according to the invention.

Identical parts in the Figures are identified by the same reference numbers.

The two-legged body according to the invention comprises two legs, 2, 3, an oscillation element 14, and a connecting element 7 for the mutual coupling of the legs 2, 3 and the oscillation element 14. The legs 2, 3 are pivotable in relation to the connecting element 7, and during operation may undergo a reciprocating angular displacement in relation to the connecting element 7 subject to the oscillation element 14. The oscillation element 14 comprises. for example, at least two springs for the generation of antagonistic forces. Each spring is coupled at one side with a leg 2, 3, forming together with the connecting element 7 a vibrating mass-spring system. Each of the springs, 4, 5 has an adjustable spring stiffness. So-called McKibben muscles can be conveniently used for this purpose. Alternatively, the spring stiffness of one of the springs 4, 5 may be adjusted to a permanent setting so that only the spring stiffness of the other spring 4, 5 is adjustable. The spring that is permanently adjusted may then by replaced by a construction in which the gravitational force is utilized to provide an antagonistic force in relation to the adjustable spring. At the side facing away from the coupling with the leg 2, 3, each of the springs 4, 5 is coupled with the connecting element 7, so that the springs are arranged at both sides of the legs 2, 3. Preferably the connecting element 7 is embodied with a cylindrical rotating spool 8, and over the rotating spool a connecting cable or strip is led which is connected at the two extreme ends with the two springs 4, 5 and may be connected therebetween, at point 13, with rotating spool 8. Each of the legs 2, 3 is mounted on an auxiliary frame 9 which is rotatably mounted on the connecting element 7. Each leg is adjustable in the longitudinal direction of the auxiliary frame 9. This may be realized by means of a spring system 10, 11, whereby activation of the spring 10 causes its contraction, thereby moving part 12 in the direction of arrow A, so that the legs 2, 3 coupled with part 12 is moved away from the connecting element 7. When the spring member 10 is released, the force of the spring 11 causes the leg 2, 3 to move in the opposite direction.

The two-legged body can be used in a variety of embodiments. The preceding description merely serves as elucidation of the invention as specified in the appended claims. The two-legged body according to the invention is suitable for application in the entertainment industry, in the robotic technology, or in the medical technology for the provision of ortheses or protheses.

What is claimed is:

1. A two-legged body comprising: at least two legs, an oscillation element and a connecting element for the mutual coupling of the at least two legs and the oscillation element, wherein the at least two legs are pivotable in relation to the connecting element and during operation undergo a reciprocating angular displacement in relation to the connecting element, depending on the oscillation element, characterized in that the oscillation element comprises at least two springs for the generation of antagonistic forces, each spring having first and second sides, that the first sides of the springs each are coupled with a leg, and that together with the mass present in the connecting element they are able to form a vibrating mass-spring system, and that the spring stiffness of at least one spring is adjustable.

2. A two-legged body according to claim 1, characterized in that the second side of the springs each are coupled with the connecting element, and that the springs are arranged at both sides of the leg.

3. A two-legged body according to claim 1, characterized in that the connecting element is embodied with a rotating spool and that via the rotating spool a connecting cable is led which is connected at both ends with the two springs.

4. A two-legged body according to claim 1, characterized in that each of the at least two legs is mounted on an individual auxiliary frame, each auxiliary frame is rotatably mounted on the connecting element, and each leg is adjustable in the longitudinal direction of its auxiliary frame.

5. A two-legged body according to one-of the preceding claims, characterized in that the springs are McKibben-muscles.

\* \* \* \* \*